United States Patent
Iwamoto

(10) Patent No.: US 9,734,111 B2
(45) Date of Patent: Aug. 15, 2017

(54) POS TERMINAL AND COMPARISON DETERMINATION METHOD OF I/O CARD CONNECTED WITH THE SAME

(71) Applicant: TOSHIBA TEC KABUSHIKI KAISHA, Shinagawa-ku, Tokyo (JP)

(72) Inventor: Jun Iwamoto, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/662,412

(22) Filed: Mar. 19, 2015

(65) Prior Publication Data

US 2016/0275035 A1    Sep. 22, 2016

(51) Int. Cl.
| | | |
|---|---|---|
| *G06K 5/00* | (2006.01) | |
| *G06F 13/40* | (2006.01) | |
| *G06Q 20/20* | (2012.01) | |
| *G06F 13/24* | (2006.01) | |
| *G06F 13/10* | (2006.01) | |
| *G07G 1/14* | (2006.01) | |

(52) U.S. Cl.
CPC ........ *G06F 13/4068* (2013.01); *G06F 13/107* (2013.01); *G06F 13/24* (2013.01); *G06Q 20/20* (2013.01); *G07G 1/14* (2013.01)

(58) Field of Classification Search
CPC .................................................. G06Q 30/0268
USPC .......................................................... 235/380
See application file for complete search history.

(56) References Cited

U.S. PATENT DOCUMENTS

| | | | | |
|---|---|---|---|---|
| 6,360,952 B1* | 3/2002 | Kimlinger | .......... | G06K 7/10297 235/486 |
| 2010/0251308 A1* | 9/2010 | Ohki | ...................... | H04H 60/73 725/54 |

FOREIGN PATENT DOCUMENTS

JP    2003-168092    6/2003

* cited by examiner

*Primary Examiner* — Jamara Franklin
(74) *Attorney, Agent, or Firm* — Amin, Turocy & Watson LLP

(57) ABSTRACT

In accordance with one embodiment, a POS terminal comprises a connection section configured to connect with an I/O card; a card information acquisition section configured to acquire, when a first I/O card connected with a general-purpose component is connected with the connection section, hardware information of the I/O card containing a model number; a card information storage section configured to store a model number list of supportable I/O cards; and a card information comparison determination section configured to determine whether or not the model number of the first I/O card is recorded in the model number list.

14 Claims, 4 Drawing Sheets

POS TERMINAL AND COMPARISON DETERMINATION METHOD OF I/O CARD CONNECTED WITH THE SAME

FIELD

Embodiments described herein relate generally to a POS terminal and a comparison determination method of an I/O card connected with the POS terminal.

BACKGROUND

Generally, a peripheral device such as a keyboard, a drawer device, a display device and the like is connected with a POS terminal. There is no interface problem if these peripheral devices are integrally formed with the POS terminal.

However, there exist interface problems when the user is to connect a drawer device or a display device (herein, referred to as general-purpose components) of other makers with the POS terminal. That is, it is a problem whether or not it is possible to exchange data between the POS terminal and these general-purpose components.

There is a case in which it is impossible to exchange data even if the connector is in the same shape. Thus, an input/output (I/O) card is used between the POS terminal and these general-purpose components.

The present invention provides a POS terminal and a comparison determination method of an I/O card connected with the POS terminal, through which it is possible to easily determine whether or not the general-purpose component can be connected with the POS terminal in a case in which the connection of the I/O card is carried out.

BRIEF DESCRIPTION OF THE DRAWINGS

The accompanying drawings, which are incorporated in and constitute a part of this specification, illustrate an embodiment of the invention and together with the description, serve to explain the principles of the invention.

DETAILED DESCRIPTION

In accordance with one embodiment, a POS terminal comprises a connection section configured to connect with an I/O card; a card information acquisition section configured to acquire, when a first I/O card connected with a general-purpose component is connected with the connection section, hardware information of the I/O card containing a model number; a card information storage section configured to store a model number list of supportable I/O cards; and a card information comparison determination section configured to determine whether or not the model number of the first I/O card is recorded in the model number list.

Reference will now be made in detail to the present embodiment of the invention, an example of which is illustrated in the accompanying drawing.

Hereinafter, the embodiment is described with reference to the accompanying drawings.

Figure 1:
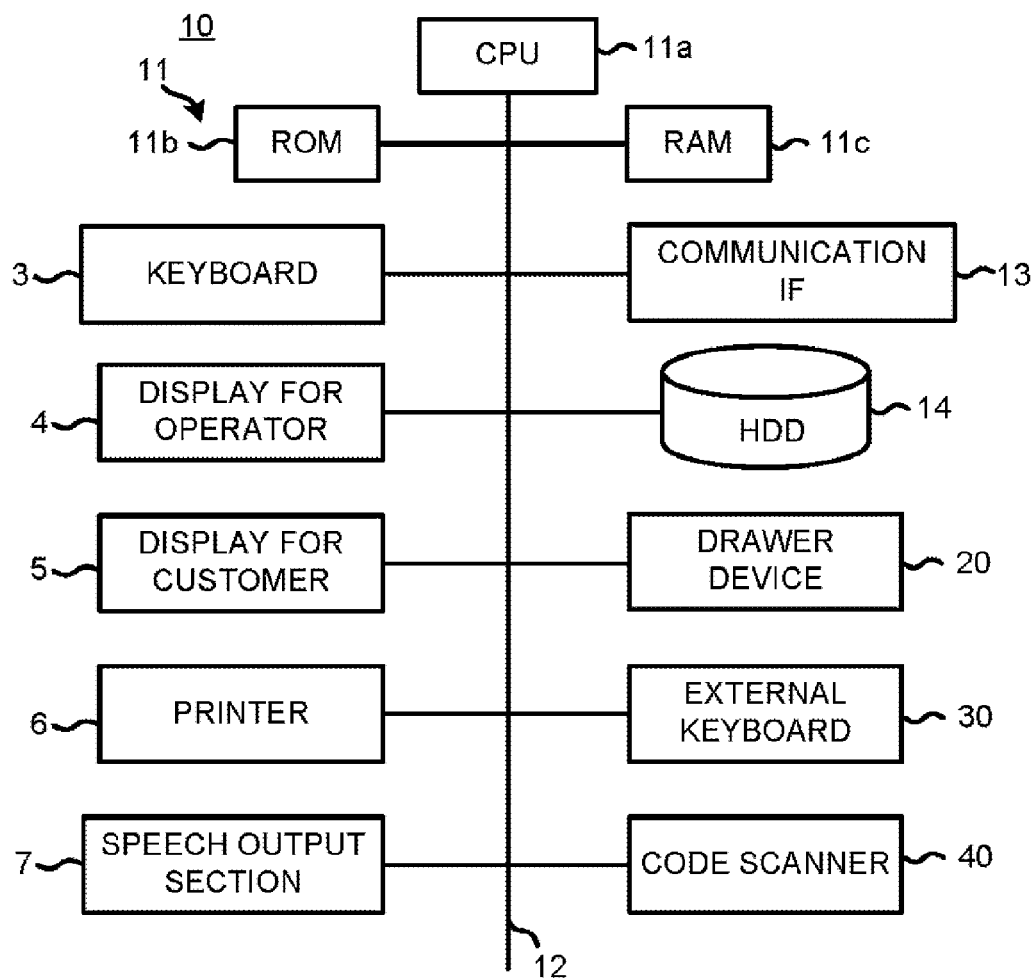
FIG. 1 is a diagram illustrating an example of the schematic constitution of a POS terminal.

FIG. 1 is a diagram illustrating the electrical connection of a POS terminal 10. As shown in FIG. 1, the POS terminal 10 is provided with a control section 11 consisting of a CPU (Central Processing Unit) 11a, a ROM (Read Only Memory) 11b and a RAM (Random Access Memory) 11C. The CPU 11a executes various operations and controls each section. The ROM 11b stores a computer program and the like. The RAM 11c stores various data in a rewritable manner.

The RAM 11c functions as various work areas through the function of storing changeable data in a rewritable manner.

A keyboard 3, a display for operator 4, a display for customer 5, a printer 6, a speech output section 7, a communication interface (IF) 13 for executing data communication with an external electronic machine such as a host computer (not shown) and the like, a drawer device 20, an external keyboard 30, a code scanner 40 and the like are connected with the control section 11 through a bus line 12. Further, a HDD (Hard Disc Drive) 14 in which a commodity master file, a control program for operating the control section 11 and the like are stored is also connected with the control section 11 through a bus line 12.

The keyboard 3, through which an operator can input the category, the model name and the like of a commodity, includes numeric keys for inputting the price and numeric values of the cash amount deposited from a customer.

The display for operator 4, which displays, for confirmation, the characters, amount, total amount and the like input by the operator, is arranged in such a manner that the display screen thereof is directed to the operator. The display for customer 5, which displays, for confirmation, the characters, amount, total amount and the like input by the operator to the customer, is arranged in such a manner that the display screen thereof is directed to the customer.

The printer 6 records the category and the number of each commodity on a recording medium. The printer 6 outputs, for example, a receipt as the recording medium.

The speech output section 7, which issues a speech or sound to cause the attention of the operator or the customer, is generally used as an auxiliary of the display in the display for operator 4 and the display for customer 5.

The communication IF 13 is used to carry out data transmission/reception between the POS terminal and an external machine through a network.

The drawer device 20 stores money received from the customer and money to be dispensed to the customer as change of an amount obtained by subtracting the total amount of the commodities purchased by the customer from the received money.

The external keyboard 30 is a large-sized easy-to-use keyboard connected with the POS terminal as needed. The code scanner 40 scans a barcode and the like printed on the commodity to input characters, numeric values and the like.

In general case, each of these sections constituting the POS terminal 10 can only be replaced with the exactly same component if it is broken. However, for example, there is a case in which a component (general-purpose component) that is used generally and has the same function may be connected with the POS terminal 10 to be used as the component.

In this case, the general-purpose component cannot be connected directly to the POS terminal 10 as it is. Thus, an interface card (I/O card) is used to connect the general-purpose component with the POS terminal 10.

In the embodiment, for example, the display for customer 5 and the drawer device 20 are connected with the POS terminal 10 as other general-purpose components.

Figure 2:
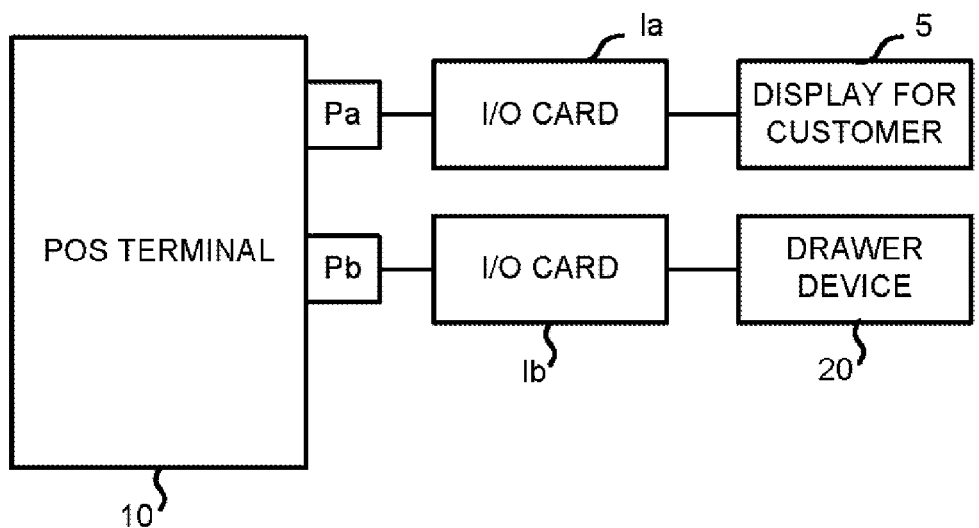
FIG. 2 is a diagram illustrating a state in which the POS terminal is connected with an I/O card according to one embodiment.

FIG. 2 is a diagram illustrating the constitution in which the display for customer 5 and the drawer device 20 are connected with the POS terminal 10 through I/O cards Ia and Ib.

Herein, the POS terminal 10 refers to a device exerting POS function other than the general-purpose component.

The POS terminal 10 is equipped with ports Pa and Pb (first terminals) serving as connectors with which the I/O cards Ia and Ib are connected.

On the other hand, other terminals (second terminals) of the I/O cards are connected with the display for customer 5 and the drawer device 20, respectively. Specifically, the display for customer 5 is connected with the I/O card Ia and the I/O card Ia is connected with the port Pa of the POS terminal 10. The drawer device 20 is connected with the I/O card Ib and the I/O card Ib is connected with the port Pb of the POS terminal 10.

The ports Pa and Pb serve as connection sections of the POS terminal 10 which are connected with the connectors of the I/O cards Ia and Ib, and carry out the transfer of signals with the I/O cards Ia and Ib when energized.

Figure 3:
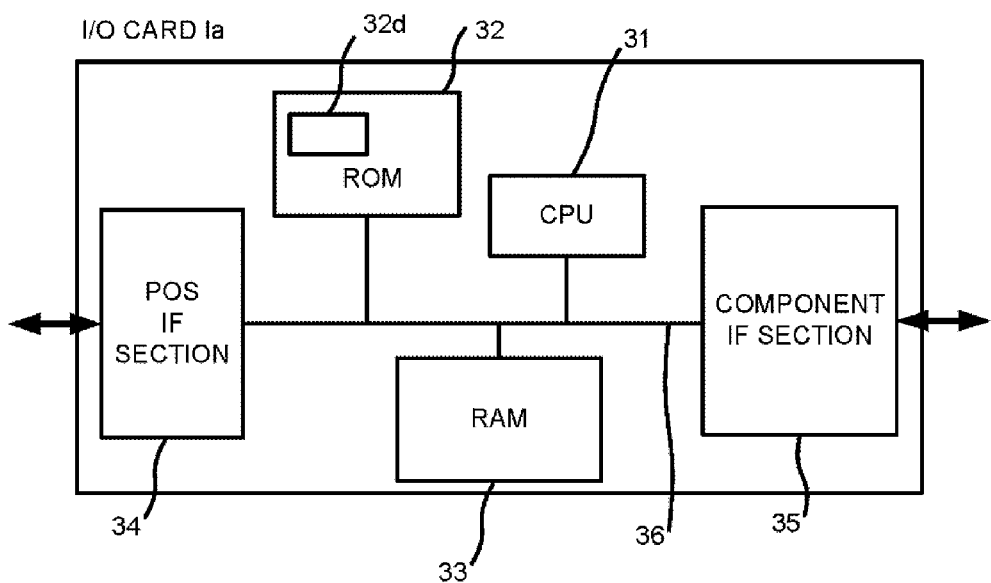
FIG. 3 is a diagram illustrating an example of the schematic constitution of the I/O card according to the embodiment.

FIG. 3 is a diagram illustrating the structure of the I/O card as an example. The I/O card includes a CPU 31, a ROM (Read Only Memory) 32, a RAM (Random Access Memory) 33, a POS IF section 34 and a component IF section 35. Each section is connected with each other through a bus line 36.

The CPU 31 controls the whole I/O card. The POS IF section 34 constitutes an interface with the POS terminal 10 at the first terminal connected with the POS terminal.

The component IF section 35 constitutes an interface with the display for customer 5 serving as a general-purpose component connected with the second terminal.

There is an area for a ROM for identification 32d in the ROM 32, and in this area are stored, for example, a unique identification number ID and a model number of the I/O card, and a firmware for examining the contents of the POS terminal or the general-purpose component in a pre-determined procedure when the I/O card is connected with the POS terminal or the general-purpose component. Each of these sections is controlled by the CPU 31.

Figure 4:
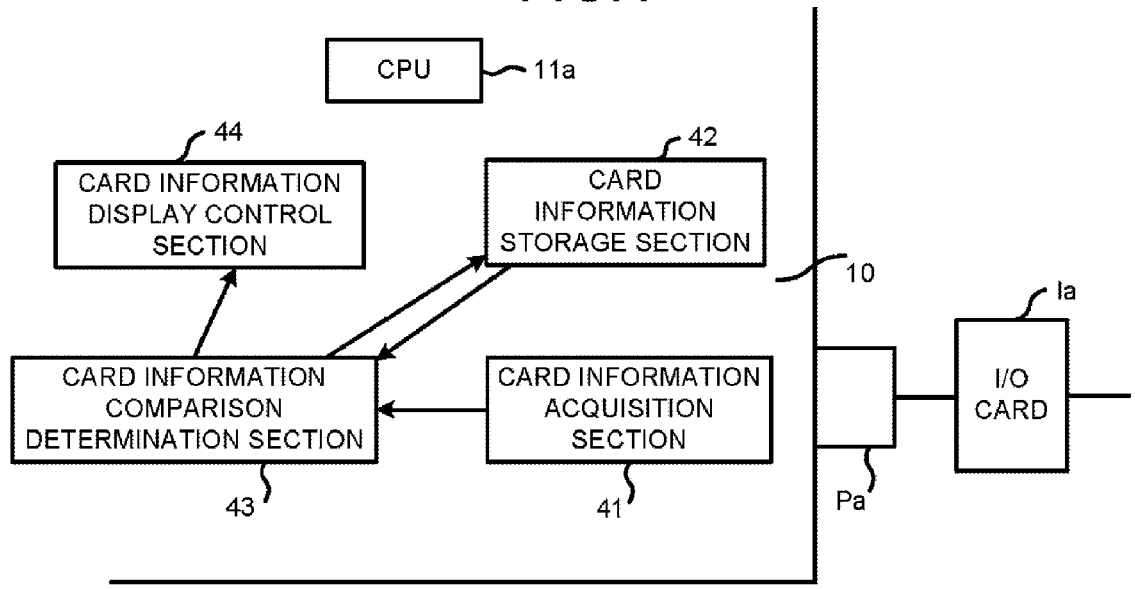
FIG. 4 is a diagram illustrating an example of the main constitutions of the POS terminal in a case of carrying out card information comparison in the embodiment.

FIG. 4 is a diagram illustrating the functional inner structure of the POS terminal 10 when connected with the I/O card Ia. As shown in FIG. 1, the POS terminal 10 includes various circuit sections for operating as a general POS terminal 10; however, only main sections operating when the I/O card Ia is connected with the POS terminal are shown in FIG. 4.

In FIG. 4, the POS terminal 10 includes a card information acquisition section 41, a card information storage section 42, a card information comparison determination section 43 and a card information display control section 44. The card information acquisition section 41 acquires the hardware information such as the identification number ID of the card, the category (model number) of the card and the like when the I/O card is connected, and the hardware information of the general-purpose component connected with the I/O card. The card information storage section 42 stores the card information acquired by the card information acquisition section 41.

The card information comparison determination section 43 compares and determines the card information of the I/O card connected last time stored in the card information storage section 42 with the card information of the I/O card Ia connected this time. The card information display control section 44 controls to display a message indicating that the card information of the two I/O cards does not match.

Herein, the hardware information refers to the information such as standards and the like obtained from the characteristic of device. There is a case in which the hardware information of the card is referred to as card information, the hardware information of the POS terminal is referred to as POS terminal information, and the hardware information of the general-purpose component is referred to as general-purpose component information for short. Each of these sections is controlled by the CPU 11a. The hardware information of the POS terminal includes, for example, the temperature inside the device, the speed of a cooling fan, the name of the HDD and the like.

The card information acquisition section 41, the card information storage section 42, the card information comparison determination section 43 and the card information display control section 44 are arranged inside the RAM 11c shown in FIG. 1.

The card information acquisition section 41 acquires the card information such as the identification number ID of the card stored in the ROM 32 through the POS IF section 34 of the I/O card when the I/O card is connected with the POS terminal 10. The card information acquisition section 41 further acquires the information of the general-purpose component connected with the second terminal of the I/O card through the POS IF section 34 and the port Pa of the POS terminal 10.

The card information acquired by the card information acquisition section 41 is stored in the card information storage section 42 and sent to the card information comparison determination section 43. In the card information storage section 42 are stored the card information of the I/O card connected this time and the card information of the I/O card connected last time.

The card information storage section 42 further stores a supportable model number list in which the model numbers that the BIOS of the POS terminal 10 can support are listed. Whether or not the BIOS of the POS terminal 10 can support the I/O card is determined according to whether or not the model number of the I/O card contained in the card information of the I/O card is included in the model number list.

The I/O card information of the I/O card connected this time sent from the card information acquisition section 41 and the card information of the I/O card connected last time (stored in the card information storage section 42) are compared and determined in the card information comparison determination section 43. The determination of the card information is carried out by determining whether or not the categories and the like of the cards are consistent according to the model number as stated below, and comparing whether or not the identification number IDs are consistent.

The card information display control section 44 is connected with the display for operator 4. The CPU 11a controls to display the result of the comparison determination sent from the card information comparison determination section 43 on the display screen of the display for operator 4.

Figure 5:
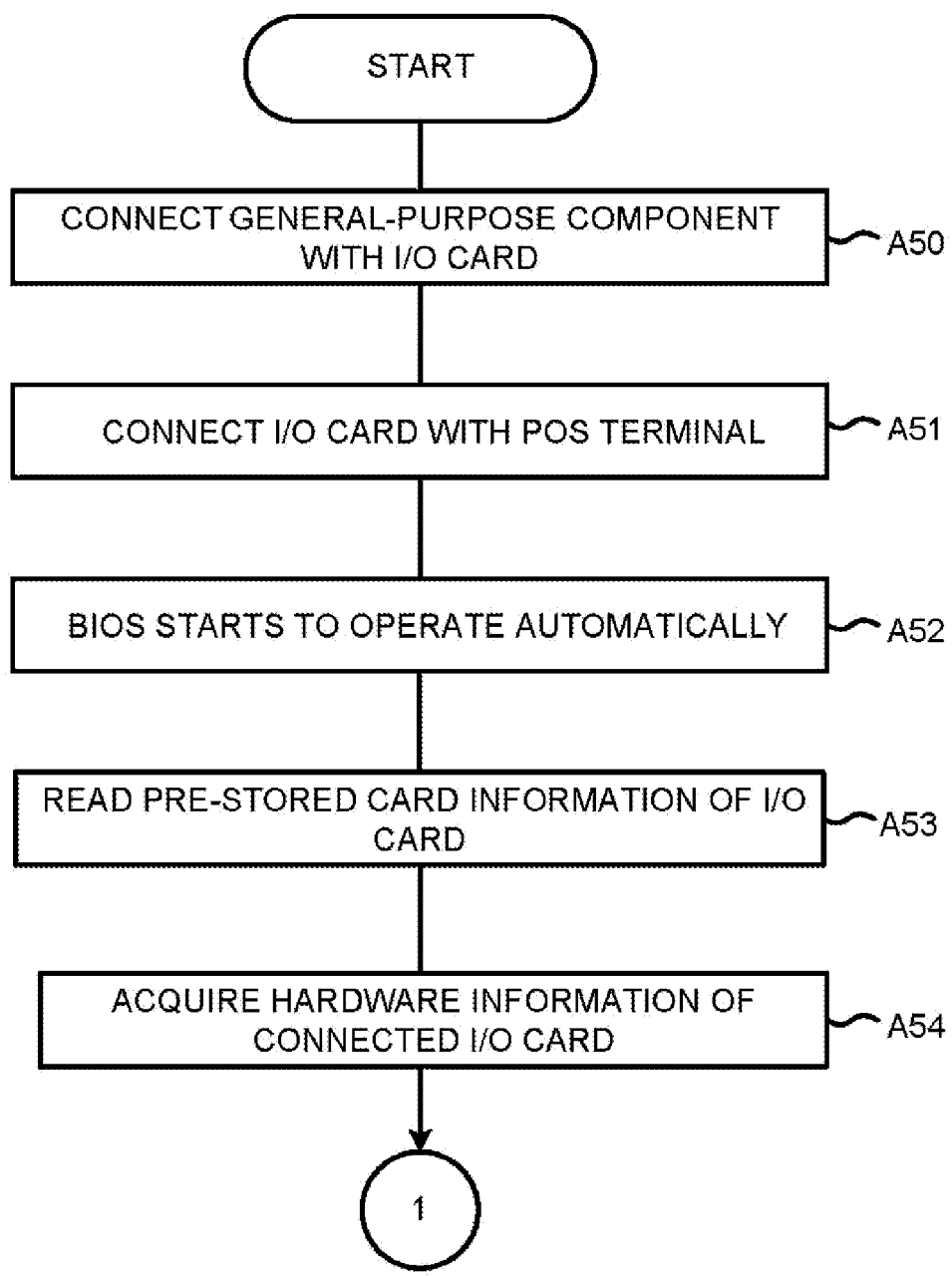
FIG. 5 is a flowchart illustrating operations according to the embodiment.
Figure 6:
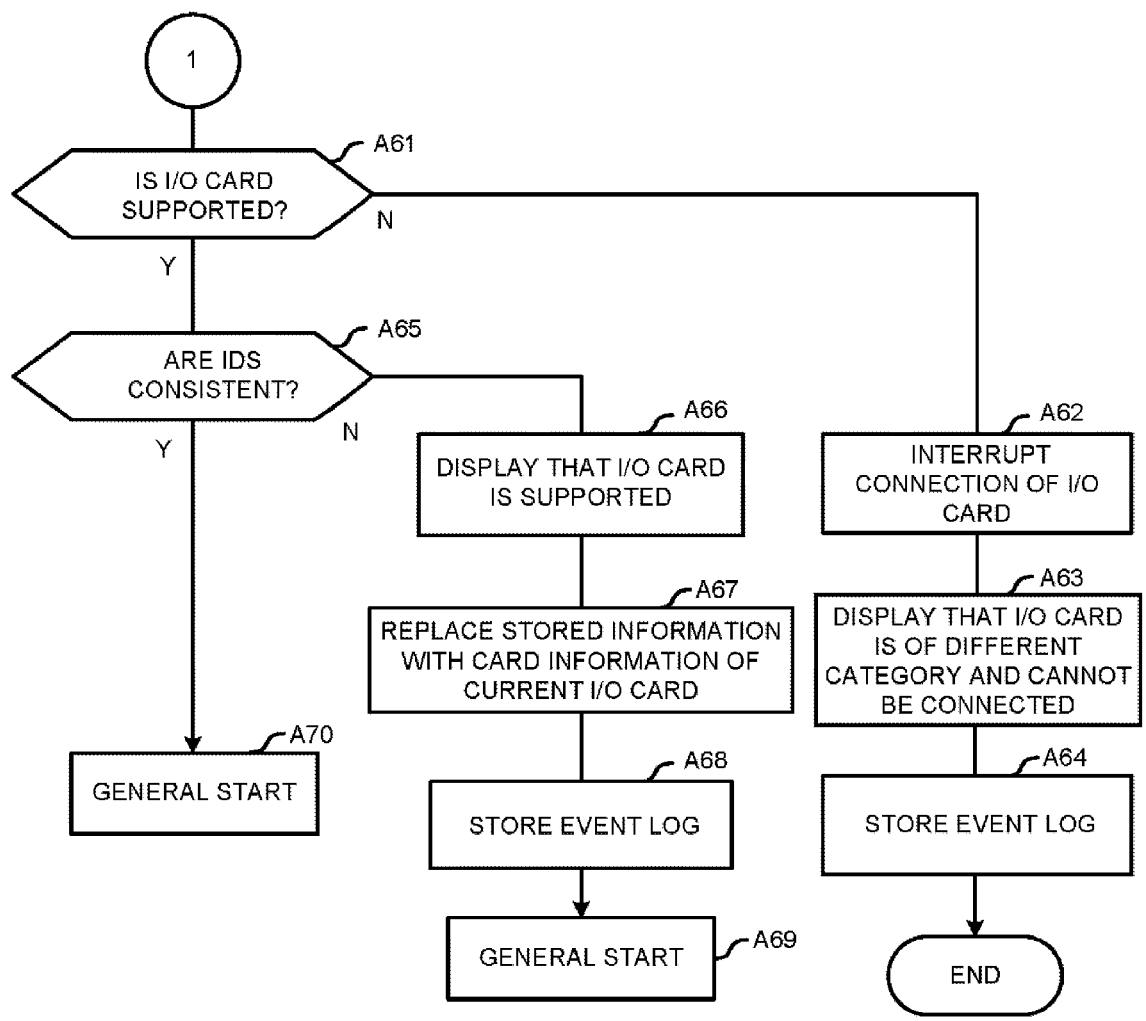
FIG. 6 is a flowchart illustrating operations in the embodiment following FIG. 5.

Next, the operations according to the present embodiment are described. FIG. 5 and FIG. 6 are flowcharts illustrating the operations according to the present embodiment.

First, the general-purpose component (for example, the display for customer 5) is connected with the I/O card Ia in ACT A50. Then the I/O card Ia is connected with the port Pa of the POS terminal 10 in ACT A51.

In a case of further connecting the drawer device 20 with the POS terminal 10, the drawer device 20 is connected with the second terminal of the I/O card Ib and then the first terminal of the I/O card Ib is connected with the port Pb of the POS terminal 10.

In this way, the general-purpose component and the POS terminal are connected with the I/O card. After the operator turns on the power switch of the POS terminal 10, the BIOS (Basic Input/Output System) of the POS terminal 10 starts to operate in ACT A52.

In ACT A53, the CPU 11a reads the hardware information of the I/O card connected last time which is already stored in the card information storage section 42.

In ACT A54, the CPU 11a acquires the hardware information of the I/O card connected this time through the port Pa of the POS terminal 10 by the card information acquisition section 41.

Sequentially, it is compared and determined whether or not the connected I/O card is supported by the POS terminal according to the model number, model name and the like in ACT A61 shown in FIG. 6.

In the card information comparison determination section 43, the category (for example, model number) of the I/O card within the card hardware information is compared with the supportable model number list. If it is determined that the model number of the I/O card is not included in the list, the I/O card is not supported, and thus, the CPU 11a interrupts the connection of the I/O card in ACT A62.

In ACT A63, the CPU 11a sends a control signal indicating that the I/O card is of a different category and cannot be connected with the POS terminal to the card information display control section 44 to display the message on the display screen of the display for operator 4. In ACT A64, an event log at this time is stored. The event log in this case includes an error log such as that the hardware information cannot be read or started, the temperature is high, the memory cannot be read and the like, and an information log such as that the log is cleared at the time of start.

The event log in this case includes the error log such as that the I/O card is determined to be not supportable based on a determination standard of model number. These event logs are stored in the card information storage section 42.

On the other hand, if it is determined in ACT A61 that the I/O card is supported (YES in ACT A61), the card information comparison determination section 43 compares and determines whether or not the identification number ID is consistent with the identification number ID of the former I/O card in ACT A65.

If the identification number ID is not consistent with the identification number ID of the former I/O card (NO in ACT A65), a message indicating that the I/O card connected this time is different from the I/O card connected last time is transmitted to the card information display control section 44 and displayed on the display screen of the display for operator in ACT A66.

In ACT A67, the stored card information of the I/O card connected last time is replaced with the card information such as the identification number ID, the model number and the like of the I/O card connected this time. The event log in this case is stored in ACT A68, and then the general start is carried out in ACT A69.

In this case, the I/O card connected this time, though different from the I/O card connected last time, is a supportable I/O card, thus, there is no problem to connect the I/O card with the POS terminal 10. On the other hand, if the identification number ID is consistent with the identification number ID of the former I/O card (YES in ACT A65), the I/O card connected this time is the same as the I/O card used last time, thus, the general start is carried out.

It is exemplified in the embodiment described above that it is determined whether or not the I/O card is a supportable card first, and then the identification number IDs are compared to determine whether or not they are the same I/O card. However, the present invention is not limited to this. It is also applicable to compare the identification number IDs to determine whether or not they are the same I/O card first.

It is exemplified in the embodiment described above that the display for customer and the drawer device are connected as the general-purpose components. However, the present invention is not limited to this. It can be applied to any case of replacing the components used in the POS terminal with the general-purpose components.

It is exemplified in the embodiment described above that a corresponding message is displayed when the I/O card is not a supportable card. However, the present invention is not limited to this. It is also applicable to cause the attention of the operator through a speech or a sound and the like without displaying the message.

In the embodiment described above, whether or not the I/O card is a supportable card is determined according to the model number. However, the present invention is not limited to this. It is also applicable to determine whether or not the I/O card is a supportable card according to other card information.

In accordance with the embodiment, there can be provided a POS terminal and a comparison determination method of an I/O card connected with the POS terminal, through which it is possible to easily determine whether or not the card is a card that can connect the general-purpose component with the POS terminal in a case in which the connection of the I/O card is carried out.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A POS terminal comprising:
   a connection section configured to connect with an I/O card;
   a card information storage section configured to previously store a model number list in which a model number and hardware information of supportable I/O cards are recorded;
   a card information acquisition section configured to acquire, when an I/O card connected with a general-purpose component is connected with the connection section, a model number and hardware information of the I/O card, the general-purpose component selected from the group consisting of a display, a drawer device, a keyboard, a printer, a speech output device, a code scanner, or a communication interface; and
   a card information comparison determination section configured to determine whether or not the model number of the I/O card that is connected is recorded in the model number list, and if the model number of the I/O card is recorded in the model number list, to determine that the I/O card is supportable.

2. The POS terminal according to claim 1, wherein the connection of the I/O card to the POS terminal is interrupted if it is determined by the card information comparison determination section that the model number of the I/O card is not recorded in the model number list.

3. The POS terminal according to claim 2, wherein a warning indicating that the I/O card is not supported is issued if it is determined that the model number of the I/O card is not recorded in the supportable model number list by the card information comparison determination section.

4. The POS terminal according to claim 3, further comprising:
a display device configured to display the warning that the I/O card is not supported on a screen of the display device.

5. The POS terminal according to claim 1, wherein the general-purpose component is a display and the display is an operator display or a customer display.

6. A POS terminal comprising:
a connection section configured to connect with an I/O card;
a card information storage section configured to previously store a model number list in which a model number, hardware information, and an identification number of supportable I/O cards are recorded;
a card information acquisition section configured to acquire, when an I/O card connected with a general-purpose component is connected with the connection section, a model number, hardware information, and the identification number of the I/O card, the general-purpose component selected from the group consisting of a display, a drawer device, a keyboard, a printer, a speech output device, a code scanner, or a communication interface; and
a card information comparison determination section configured to determine whether or not the model number of the I/O card that is connected is recorded in the model number list, and to determine whether or not the identification number of the I/O card is consistent with one of the identification numbers in the model number list, the connection of the I/O card to the POS terminal is interrupted if it is determined by the card information comparison determination section that the model number of the I/O card is not recorded in the model number list, the POS terminal starts if the identification number of the I/O card is consistent with one of the identification numbers in the model number list.

7. The POS terminal according to claim 6, further comprising:
a display device configured to display the warning that the I/O card is not supported on a screen of the display device if it is determined that the model number of the I/O card is not recorded in the model number list by the card information comparison determination section.

8. The POS terminal according to claim 6, wherein if it is determined that the model number of the I/O card is recorded in the model number list and that the identification number of the I/O card is not consistent with any one of the identification numbers in the model number list by the card information comparison determination section, the hardware information of the model number list is replaced with the hardware information of the I/O card and the POS terminal starts.

9. The POS terminal according to claim 6, wherein the general-purpose component is a display and the display is an operator display or a customer display.

10. A POS terminal comprising:
a connection section configured to connect with an I/O card;
a card information acquisition section configured to acquire, when a first I/O card is connected with a general-purpose component is connected with the connection section, a model number, hardware information and an identification number of the first I/O card, the general-purpose component selected from the group consisting of a display, a drawer device, a keyboard, a printer, a speech output device, a code scanner, or a communication interface;
a card information storage section configured to store the model number, the hardware information, and the identification number of the first I/O card obtained by the card information acquisition section;
a card information comparison determination section configured to determine, when a second I/O card is connected with a general-purpose component is connected with the connection section after the first I/O card is removed, whether or not the model number of the second I/O card number acquired by the card information acquisition section and the model number of the first I/O card stored in the card information storage section are the same.

11. The POS terminal according to claim 10, further comprising:
a display device configured to display, if it is determined by the card information comparison determination section that the model number of the second I/O card and the model number of the first I/O card are not the same, the determination result on a screen of the display device.

12. The POS terminal according to claim 10, wherein the general-purpose component is a display and the display is an operator display or a customer display.

13. A comparison determination method of an I/O card connected with a POS terminal, including:
previously storing a model number list of supportable I/O cards, in which a model number and hardware information are recorded;
connecting with an I/O card of the POS terminal;
acquiring, when an I/O card connected with a general-purpose component is connected with a connection section, the model number and hardware information of the I/O card, the general-purpose component selected from the group consisting of a display, a drawer device, a keyboard, a printer, a speech output device, a code scanner, or a communication interface;
determining whether or not the model number of the I/O card is recorded in the model number list; and
if the model number of the I/O card is recorded in the model number list, determining that the I/O card is supportable.

14. A comparison determination method according to claim 13, wherein the general-purpose component is a display and the display is an operator display or a customer display.

* * * * *